US009631846B2

(12) United States Patent
Chen et al.

(10) Patent No.: US 9,631,846 B2
(45) Date of Patent: Apr. 25, 2017

(54) SEASONAL THERMAL ENERGY STORAGE SYSTEM

(71) Applicant: SUNSHINE KAIDI NEW ENERGY GROUP CO., LTD, Wuhan (CN)

(72) Inventors: Yilong Chen, Wuhan (CN); Shuchuan Hu, Wuhan (CN)

(73) Assignee: SUNSHINE KAIDI NEW ENERGY GROUP CO., LTD., Wuhan (CN)

( * ) Notice: Subject to any disclaimer, the term of this patent is extended or adjusted under 35 U.S.C. 154(b) by 393 days.

(21) Appl. No.: 14/285,666

(22) Filed: May 23, 2014

(65) Prior Publication Data
US 2014/0250931 A1 Sep. 11, 2014

Related U.S. Application Data

(63) Continuation-in-part of application No. PCT/CN2012/083696, filed on Oct. 29, 2012.

(30) Foreign Application Priority Data

Nov. 25, 2011 (CN) .......................... 2011 1 0381778

(51) Int. Cl.
*F25B 27/00* (2006.01)
*F24D 11/00* (2006.01)
(Continued)

(52) U.S. Cl.
CPC .......... *F25B 27/007* (2013.01); *F24D 11/003* (2013.01); *F24F 5/0017* (2013.01);
(Continued)

(58) Field of Classification Search
CPC ........ F25B 27/007; F25B 30/04; F25B 15/06; F24D 11/003; Y02B 10/24; Y02B 10/20;
(Continued)

(56) References Cited

U.S. PATENT DOCUMENTS 4,007,776 A * 2/1977 Alkasab ................ F24F 5/0046
126/585
4,237,859 A * 12/1980 Goettl .................. F24D 11/007
126/400
(Continued)

*Primary Examiner* — Len Tran
*Assistant Examiner* — Ana Vazquez
(74) *Attorney, Agent, or Firm* — Matthias Scholl, PC; Matthias Scholl

(57) ABSTRACT

A seasonal thermal energy storage system for heat supply and removal, including an energy-storage device, a solar collector, a refrigerating unit, and a water supply device in closed-loop connection to a user terminal. The energy-storage device includes at least a heat source storage pond and a cold source storage pond. The heat source storage pond and the cold source storage pond are connected to water source via first water pumps. The water supply device includes a hot water supply pool connected to the heat source storage pond and a cold water supply pool connected to the cold source storage pond. The solar collector is connected to the heat source storage pond and the hot water supply pool via second water pumps. The refrigerating unit is connected to the hot water supply pool and the cold water supply pool via third water pumps.

9 Claims, 3 Drawing Sheets

(51) Int. Cl.
  *F24J 2/34*    (2006.01)
  *F24F 5/00*    (2006.01)
  *F25B 15/06*   (2006.01)
  *F25B 30/04*   (2006.01)

(52) U.S. Cl.
  CPC ....... *F24J 2/345* (2013.01); *F24F 2005/0025* (2013.01); *F25B 15/06* (2013.01); *F25B 30/04* (2013.01); *Y02B 10/20* (2013.01); *Y02B 10/24* (2013.01); *Y02E 60/147* (2013.01); *Y02E 70/30* (2013.01)

(58) Field of Classification Search
  CPC . F24F 2005/0025; F24F 5/0017; Y02E 70/30; Y02E 60/147; F24J 2/345
  See application file for complete search history.

(56) References Cited

U.S. PATENT DOCUMENTS

| | | | |
|---|---|---|---|
| 6,151,726 A * | 11/2000 | Ajima | A63B 69/125 4/488 |
| 2010/0031953 A1* | 2/2010 | Penev | F24D 17/0021 126/615 |

\* cited by examiner

500 # SEASONAL THERMAL ENERGY STORAGE SYSTEM

CROSS-REFERENCE TO RELATED APPLICATIONS

This application is a continuation-in-part of International Patent Application No. PCT/CN2012/083696 with an international filing date of Oct. 29, 2012, designating the United States, now pending, and further claims priority benefits to Chinese Patent Application No. 201110381778.8 filed Nov. 25, 2011. The contents of all of the aforementioned applications, including any intervening amendments thereto, are incorporated herein by reference.

BACKGROUND OF THE INVENTION

Field of the Invention

The invention relates to the field of seasonal energy-storage, and more particularly to a seasonal thermal energy storage system.

Description of the Related Art

Conventional seasonal energy storage is limited to solar energy and the energy saving effect is poor.

SUMMARY OF THE INVENTION

In view of the above-described problems, it is one objective of the invention to provide a seasonal thermal energy storage system for heat supply and removal. The system can be applied to different kinds of constructions comprising large and medium sized cooling and heating projects, which solves the longstanding technological difficulty that the seasonal energy storage cannot be applied to large and medium sized cooling and heating projects, and provides a new way for energy conservation and emission reduction.

To achieve the above objective, in accordance with one embodiment of the invention, there is provided a seasonal thermal energy storage system for heat supply and removal, comprising an energy-storage device, a solar collector, a refrigerating unit, and a water supply device in closed-loop connection to a user terminal. The energy-storage device comprises at least a heat source storage pond and a cold source storage pond, and the heat source storage pond and the cold source storage pond are connected to water source via first water pumps; the water supply device comprises a hot water supply pool connected to the heat source storage pond and a cold water supply pool connected to the cold source storage pond; the solar collector is connected to the heat source storage pond and the hot water supply pool via second water pumps; and the refrigerating unit is connected to the hot water supply pool and the cold water supply pool via third water pumps, and is in closed-loop connection to the user terminal.

In a class of this embodiment, the energy-storage device further comprises an energy-storage ball disposed in an energy-storage box; the energy-storage ball comprises a heat energy storage ball and a cold energy storage ball; the heat energy storage ball is in closed-loop connection to the solar collector and is connected to the user terminal; and the cold energy storage ball is in closed-loop connection to the refrigerating unit and is connected to the user terminal and the cold water supply pool.

In a class of this embodiment, the heat energy storage ball and the cold energy storage ball are alternately disposed in the energy storage box in winter and in summer.

In a class of this embodiment, the system further comprises an auxiliary hot-water boiler in closed-loop connection the hot water supply pool via a water pump.

In a class of this embodiment, the solar collector is connected to the user terminal and is in closed-loop connection to the heat source storage pond.

In a class of this embodiment, the solar collector employs a trough heat concentrating device, and the refrigerating unit employs a non-electric lithium bromide absorption refrigerating machine.

In a class of this embodiment, the user terminal is a low temperature ground radiant panel.

In a class of this embodiment, the water inlet pipes of the heat source storage pond and the cold source storage pond are provided with a filter-sterilizer.

In a class of this embodiment, the temperature sensors and liquid level detectors are disposed in the heat source storage pond, the cold source storage pond, the hot water supply pool, and the cold water supply pool; and all the water pumps are provided with a magnetic valve.

In a class of this embodiment, the system further comprises an intelligent control unit, the intelligent control unit is connected to the temperature sensors, the liquid level detectors, and the magnetic valve for controlling the opening/closing of the magnetic valve according to signals gathered by the temperature sensors and the liquid level detectors whereby opening/closing corresponding water pumps.

In a class of this embodiment, the solar collector is replaced by an industrial waste heat supply device.

Advantages according to embodiments of the invention are summarized as follows.

In the embodiments of the invention, the seasonal energy-storage device, the solar collector, the water supply device, and the user terminal form a closed-loop cooling and heating system. The seasonal energy-storage technology can be successfully applied to the large sized cooling and heating projects, with good energy saving efficiency.

DETAILED DESCRIPTION OF THE EMBODIMENT

For further illustrating the invention, experiments detailing a seasonal thermal energy storage system for heat supply and removal are described below with reference to FIGS. 1-3. It should be noted that the following examples are intended to describe and not to limit the invention.

Figure 1:
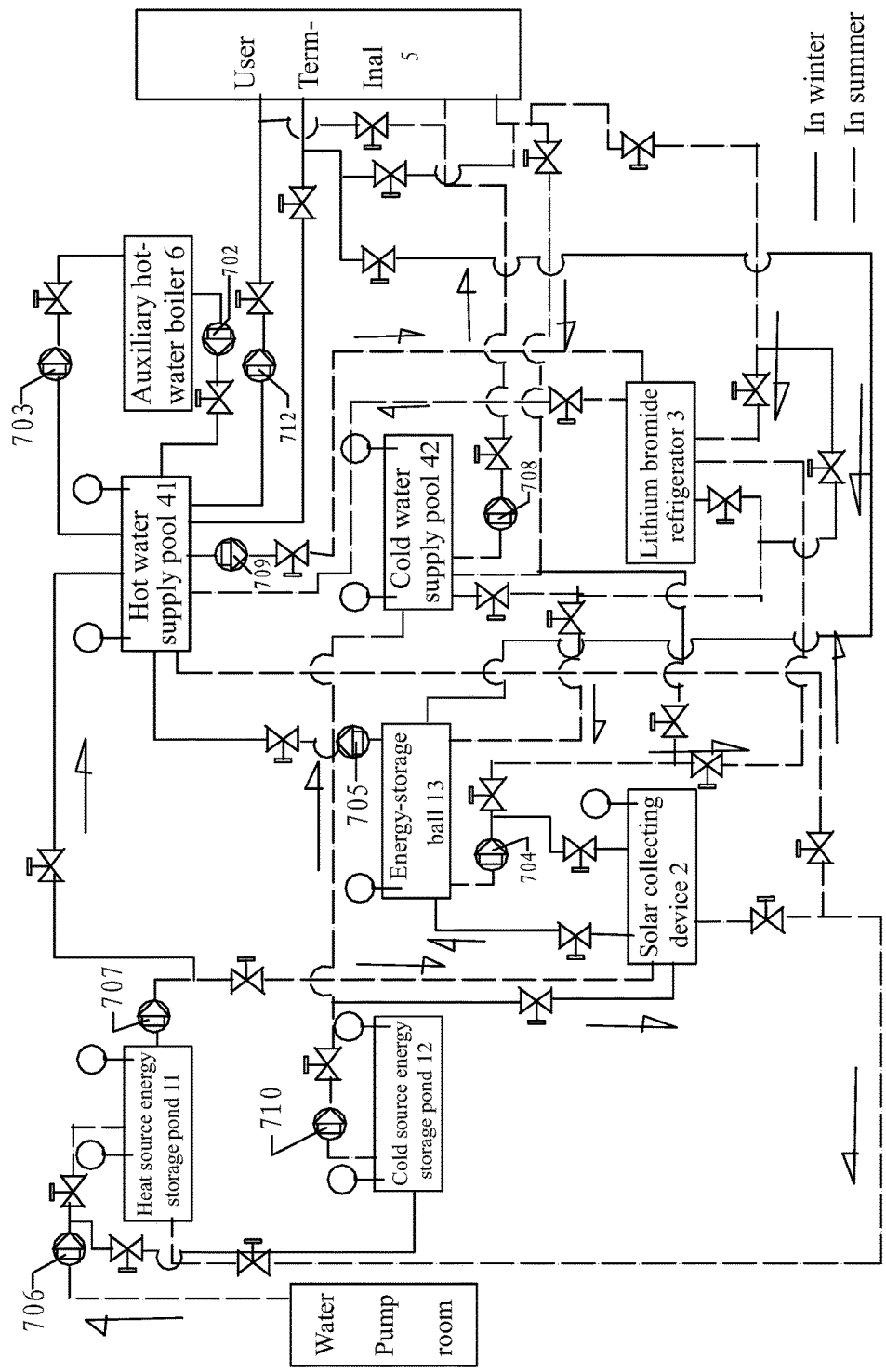
FIG. 1 is a schematic diagram of a seasonal thermal energy storage system for heat supply and removal according to one embodiment of the invention.

As shown in FIG. 1, a seasonal thermal energy storage system for heat supply and removal comprises an energy-storage device, a solar collector 2, a refrigerating unit 3, and a water supply device in closed-loop connection to a user terminal 5. The energy-storage device comprises at least a heat source storage pond 11 and a cold source storage pond 12, and the heat source storage pond 11 and the cold source storage pond 12 are connected to water source via first water pumps. The water supply device comprises a hot water supply pool 41 connected to the heat source storage pond 11 and a cold water supply pool 42 connected to the cold source storage pond 12. The solar collector is connected to the heat source storage pond 11 and the hot water supply pool 41 via second water pumps. The refrigerating unit 3 is connected to the hot water supply pool 41 and the cold water supply pool 42 via third water pumps, and is in closed-loop connection to the user terminal 5.

The energy-storage device further comprises an energy-storage ball 13 disposed in an energy-storage box. The energy-storage ball 13 comprises a heat energy storage ball 131 and a cold energy storage ball 132. The heat energy storage ball 131 is in closed-loop connection to the solar collector 2 and is connected to the user terminal 5. The cold energy storage ball 132 is in closed-loop connection to the refrigerating unit 3 and is connected to the user terminal 5 and the cold water supply pool 42.

In practice, the heat energy storage ball and the cold energy storage ball are alternately disposed in the energy storage box in winter and in summer. Specifically, in winter, a heat energy storage ball having a phase-transition temperature of 58° C. and a latent heat of phase change of 260 kj/kg is employed. In summer, a cold energy storage ball having a phase-transition temperature of 11° C. and a latent heat of phase change of 110 kj/kg is employed.

Additionally, the system further comprises an auxiliary hot-water boiler 6 in closed-loop connection the hot water supply pool 41 via a water pump.

In practice, the solar collector 2 is connected to the user terminal 5 and is in closed-loop connection to the heat source storage pond 11.

The water inlet pipes of the heat source storage pond 11 and the cold source storage pond 12 are provided with a filter-sterilizer (not shown in FIGS.).

The refrigerating unit employs a non-electric lithium bromide absorption refrigerating machine. Furthermore, temperature sensors and liquid level detectors are disposed in the heat source storage pond 11, the cold source storage pond 12, the hot water supply pool 41, and the cold water supply pool 42; and all the water pumps are provided with a magnetic valve 80.

The system further comprises an intelligent control unit (not shown in FIGS.). The intelligent control unit is connected to the temperature sensors, the liquid level detectors, and the magnetic valve for controlling the opening/closing of the magnetic valve according to signals gathered by the temperature sensors and the liquid level detectors whereby opening/closing corresponding water pumps.

Figure 2:
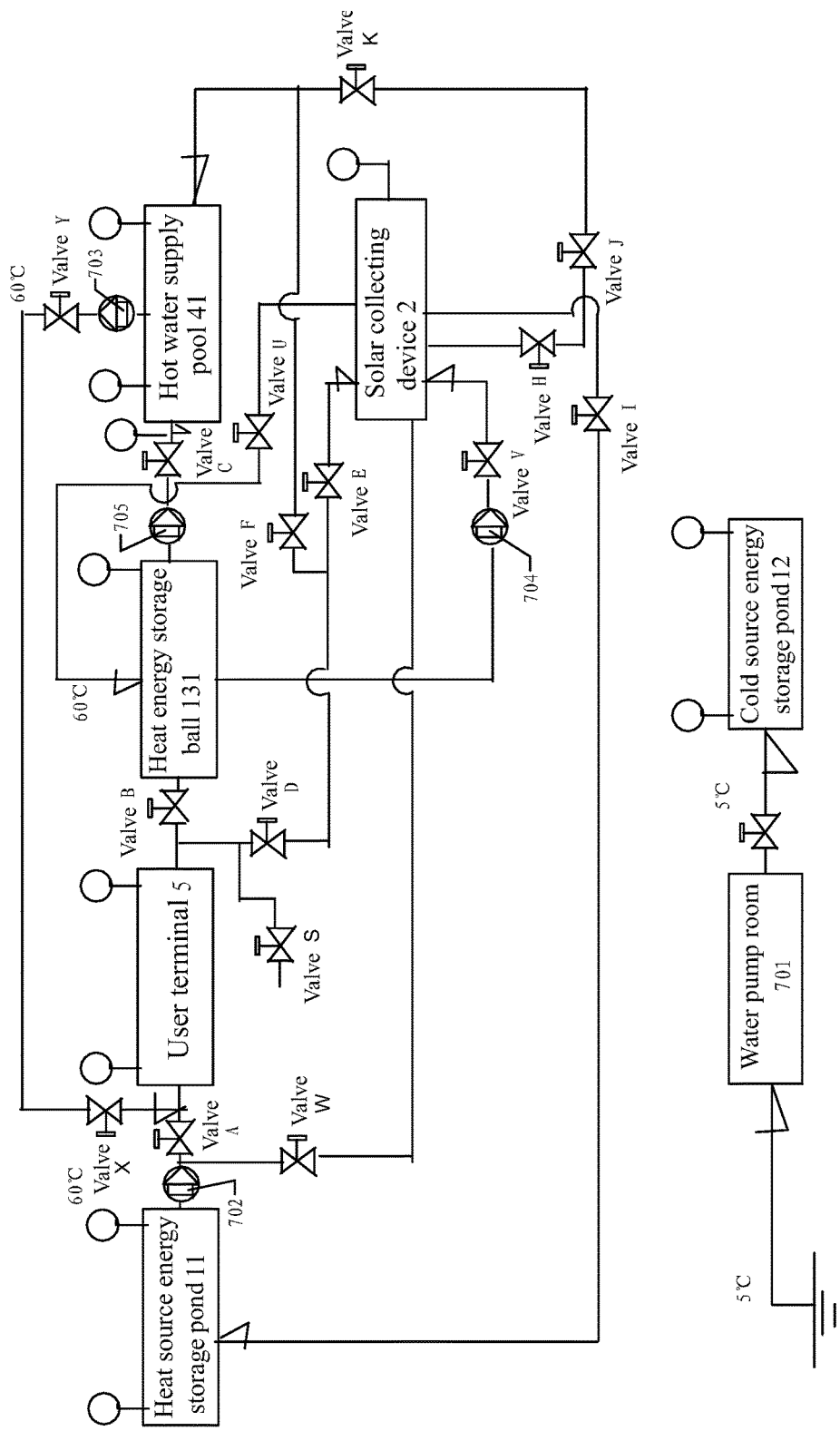
FIG. 2 is a run diagram of a seasonal thermal energy storage system for heat supply and removal in winter according to one embodiment of the invention.
Figure 3:
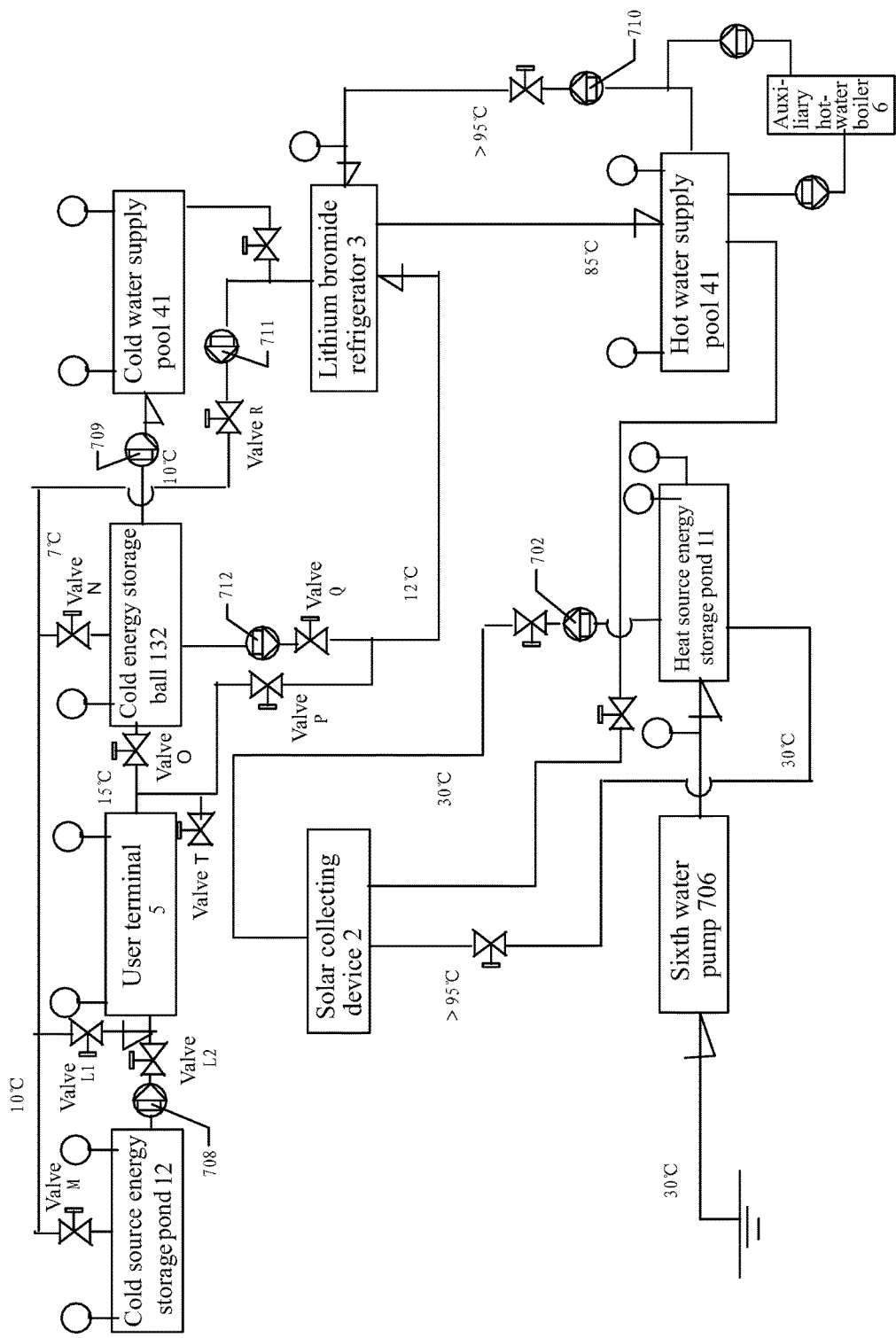
FIG. 3 is a run diagram of a seasonal thermal energy storage system for heat supply and removal in summer according to one embodiment of the invention.

With reference to FIGS. 2 and 3, the working principle of the invention is described in detail as follows.

In use, the full system in this example works for 8 months all year round: May to September in summer, and November 15$^{th}$ to February 15$^{th}$ of the next year. The cold supply and heat storage operate at the same time in summer, and heating supply and cold storage operate at the same time in winter. The hot source storage pond 11 and the cold source storage pond 12 are provided with a load capacity of 3-7 days. The hot water supply pool 41 and the cold water supply pool 42 are provided with a load capacity of 1.5 hours. The energy storage ball is configured with a load capacity of 4 hours. A heat energy storage ball is disposed in the energy storage box in winter and a cold energy storage ball in summer. Given that the user terminal 5 has a low potential energy, the low-temperature floor radiant panel is applicable with primary air system. The solar collector 2 can be a trough heat concentrating device, and can be a thermal or regular solar vacuum collector tube in places where solar intensity is strong.

FIG. 2 shows the operation principle of the example under the working condition in winter. As shown in FIG. 2, the working process is as follows:

Cold Storage Process:

Water having a temperature lower than 5° C. is drawn from the river or lake through the first water pump 701, then conveyed to the cold source storage pond 12 after being filtered and disinfected through filtering and disinfection devices reaching the water quality standard for industries. The first water pump 701 will stop working as the highest water level is observed on the equipped liquid level measurement LE. Water in the cold source storage pond 12 is stored for use in summer.

Heating Process:

Before operation in the day, close magnetic valves B/E/X/W/K and open magnetic valves A/D/F to start the second water pump 702. Draw the 45° C.-60° C. water from the hot source storage pond 11 and convey it to the hot water supply pool 41 for storage. The second water pump 702 will stop working as the highest water level is observed on the equipped liquid level measurement LE. During operation, close the magnetic valve A and open the magnetic valves X/Y to stop the second water pump 702. Start the third water pump 703 to draw water from the hot water supply pool 41 and convey it to the user terminal 5 for heating. If the temperature of water in the hot water supply pool 41 is not reaching requirement of the user, close the magnetic valve F and open the magnetic valves E and H/J/K at the same time, to convey water from water outlet of the user terminal 5 to the trough heat concentrating device for heat exchange. Mix the water with an increased temperature with water in the hot water supply pool 41 to satisfy requirement of the user. After requirement of water temperature is satisfied, close the magnetic valve E, open the magnetic valve F and close the magnetic valves H/J/K to keep the system operating in cycle. After a period of operation, close the magnetic valve F, open the magnetic valve E and open the magnetic valves H/J/G at the same time when temperature of water in the hot water supply pool 41 cannot satisfy temperature requirement. Repeat the above process to achieve normal operation of the system. In addition, the trough heat concentrating device conducts heat exchange with the heat energy storage ball 131 in the day. In winter, phase transition temperature of the heat energy storage ball is set to be 45° C.-58° C. During operation, start the second water pump 702 to pump water from the hot source storage pond 11 to the solar collector 2 to heat water to 50° C., then open magnetic valve U to pump the 50° C. water to the energy storage box 13. After heat exchange, open the magnetic valve V and the fourth water pump 704 to convey the 45° C. water back to the solar collector 2, thus to form a circulation. If it is necessary to heat water in the hot source storage pool 11, start the second water pump 702 to pump water from the hot source storage pond 11 to the solar collector 2 for heating, and then convey the water back to the hot source storage pond 11.

Only the heat energy storage ball 131 and seasonal energy storage water can be used to ensure the normal operation of the system during the night. Capacity of heat energy storage ball is set to be a maximum loading of 4 hours. Start night operation according to the conventional way of day operation, close the magnetic valve D and open the magnetic valve B to allow water from water outlet of the user terminal 5 flow to the energy storage box 13 to achieve heat exchange when temperature of water in the hot water supply pool 41 cannot reach requirements of the user. Phase transition temperature of the heat energy storage ball 131 is 45° C.-58° C., when water having a temperature lower than 40° C. runs over the heat energy storage box 13, the heat energy storage ball 131 will release heat to change from liquid to solid, while the water temperature will increase from lower than 40° C. to higher than 45° C., and water will enter into the hot water supply pool 41 via the fifth water pump 705 to complete the cycle of system.

When temperature requirements cannot be satisfied by the heat energy storage ball 131, start the magnetic valves A/S with all other magnetic valves closed. Start the second water pump 702 to pump water from the hot source storage pond 11 to supply to the user terminal 5 directly with the used water being drained into the environment directly.

FIG. 3 shows operation principle of the embodiment under the working condition in summer. As shown in FIG. 3, the working process is as follows:

Heat Storage Process:

Water having a temperature higher than 30° C. is drawn from the river or lake through the sixth water pump 706, then conveyed to the cold source storage pond 11 after being filtered and disinfected through filtering and disinfection devices reaching the water quality standard for industries. The sixth water pump 706 will stop working as the highest water level is observed on the equipped liquid level measurement LE. To increase temperature of water in the hot source storage pond 11, the 30° C. water in the hot source storage pond 11 may be pumped to the solar collector 2 via the seventh water pump 707 to be heated to 85° C.-95° C., and then conveyed back to the hot source storage pond 11 to mix with the 30° C. water in it. When the water temperature reaches 60° C., signals will be sent to the magnetic valve via a temperature sensor TE to close the seventh water pump 707, which will restart when the temperature of water in the hot source storage pond 11 decreases to 50° C. because of heat loss to ensure the temperature of water in the hot source storage pond 11 remains at 60° C. to satisfy conditions of use in winter.

Cooling Process:

Before operation in the day, start the second water pump 702. Draw the 30° C. water from the hot source storage pond 11 and convey it to the solar collector 2 for heat exchange, and then convey the water to the hot water supply pool 41 for storage when its temperature reaches 95° C. The second water pump 702 will stop working as the highest water level is observed on the equipped liquid level measurement LE. When water temperature cannot reach 95° C. for insufficiency of solar energy, concurrent heating may be performed through an auxiliary hot-water boiler 6 to increase the water temperature to ≥95° C. Start the eighth water pump 708 at the same time to pump water in the cold source storage pond 12 with a temperature lower than 10° C., start the ninth water pump 709 after the water has entered into the energy storage box 13 through the user terminal 5 to convey cold water to the cold water supply pool 42 for storage. The eighth water pump 708 and the ninth water pump 709 will stop working as the highest water level is observed on the equipped liquid level measurement LE. Upon start of operation, start tenth water pump 710 to pump water having a temperature higher than 95° C. from the hot water supply pool 41 to lithium bromide refrigerator 3 as a hot source for cooling. Pump water from the cold water supply pool 42 to prepare chilled water having a temperature of 7° C. through the eleventh water pump 711 to the user terminal 5. At the moment, the magnetic valves M/N/O/L2 is closed with the magnetic valves R/L1/P open, back water from the user terminal 5 returns to lithium bromide refrigerator. In addition, when the cooling load is relatively low in the day, the chilled water having a temperature of 7° C. prepared by lithium bromide refrigerator conducts heat exchange with the cold energy storage ball 132. Phase transition temperature of the cold energy storage ball 132 is 11° C. When chilled water having a temperature of 7° C. runs over the energy storage box 13, the cold energy storage ball 132 will release heat to change the chilled water from liquid to solid for use during the night, while the water temperature will increase from 7° C.-10° C. to 12° C.-15° C. During operation, the eleventh water pump 711 starts with magnetic valve N open. After the heat exchange is completed in the energy storage box 13, open magnetic valve Q to convey water back to lithium bromide refrigerator via the twelfth water pump 712.

Only the cold energy storage ball 132 and seasonal energy storage water can be used to ensure the normal operation of the system during the night. Capacity of heat energy storage ball is set to be a maximum loading of 4 hours. During night operation, when water in the cold water supply pool 42 cannot satisfy temperature requirement, open magnetic valve O to allow back water having a temperature of 15° C. from the user terminal 5 flow to the energy storage box 13 to achieve heat exchange. As the phase transition temperature of the cold energy storage ball 132 is 11° C., when 15° C. water enters into the energy storage box 13, the cold energy storage ball 132 will absorb the heat in water to change from solid to liquid, while water temperature will decrease from 15° C. to 10° C., and the water will be conveyed to the cold water supply pool 42 through the ninth water pump 709, thereby completing the cycle of system.

When requirements cannot be satisfied by the cold energy storage ball 132, start magnetic valve L2/T with all other magnetic valves closed. Start the eighth water pump 708 to pump water from the cold source storage pond 12 to supply to the user terminal 5 directly with the used water being drained into the environment directly.

Compared with state of the art, the advantage of the invention is that a new concept of low potential energy application has been put forward, which means to use seasonal energy storage as a new resource combined with solar energy artificially, and to use surface water as carrier for storage in sensible heat and latent heat for its large heat capacity, thus to achieve seasonal usage. This is a new attempt to use low potential energy in engineering, and there has been no precedent in the world. Main features of the invention are as follows:

Considering higher insulation in summer, apply a trough heat concentrating device to collect solar energy as hot source for cooling.

Take full advantage of solar energy to make up heat insufficiency of energy storage water in winter to ensure quality of heating.

The cooling and heating processes of buildings are ensured by the energy storage ball absorbing and releasing energy stored in the day. Energy storage water in the heat storage pool or cold storage pool may also be used to ensure normal heating and cooling of the system in case of insufficient solar energy.

Restore energy released by the energy storage ball during the night in the day to ensure normal operation during the night. The energy storage ball functions as the boiler and refrigerator.

An auxiliary hot-water boiler is adopted as standby equipment for the system to improve its safety.

Industrial waste-heat supply devices existing in the surroundings may be adopted to replace solar collector as an embodiment of flexibility of energy diversification in the system.

Intelligent control is adopted in the whole system to provide comfortable living environment as climate changes and to achieve energy-saving.

The innovative system standard using renewable natural energy combining solar energy with "seasonal energy storage" makes significant contributions in energy-saving and social benefits, compared to traditional air conditioners and air conditioner system with soil heat pump and water heat pump.

Because $CO_2$ emission around the world is too much, the global temperature has been increasing by maximum 1° C. every year according to statistics. Compared to traditional separate air conditioners, the invention can reduce 11 kg/m$^2$ $CO_2$ emission per square meter, about equal to the average emission of existing buildings in China, so the performance is very outstanding especially in "hot-summer and cold-winter" area which is in Yangtze River Basin and is one of the most developed area in China. The overall new building area around the country is increased by 2 billion m$^2$ every year. Assume that the new building area is increased by 0.5 billion m$^2$ in "hot-summer and cold-winter" area, 0.2 billion m$^2$ of which is applied with this project, then the $CO_2$ emission can be reduced by 22×108 kg to contribute to low the global temperature.

Urban heat island effect is the phenomenon that the temperature in the city is much higher than that in outlying suburb. The urban area is of high temperature while suburb has little temperature change, which makes the urban area like an island on the sea in near-surface temperature maps, so people call it urban heat island vividly. This effect makes the annual urban average temperature 1° C. higher or even more than that in suburb. In summer, local urban temperature is sometimes 6° C. higher. The reasons for this effect are diverse, but mainly are because of dramatic increase of separate air conditioner. In Shanghai, for example, there were 62.5 separate air conditioners per 100 houses in 1997, but this number has reached 300 by now. In summer, massive heat will be evacuated from these air conditioners, which make the urban heat island effect worse. In theory, this effect exists in whole year, but it will strongly influence people's life and consumption especially in hot days of summer. To address this problem, people have increased the power of air conditioners, but only made the effect much worse, we can see such vicious cycle around every day. Because separate air conditioner is not suitable for new buildings, so instead of traditional air conditioners, we will use low-temperature floor radiant panel as terminal in the project, which will reduce the heat evacuation from air conditioners so as to ease the urban heat island effect.

Because there is no air conditioner in the invention, so the energy consumption comes mainly from water pump. As an energy storage system, most subsystems besides on-watch system do not operate continuously and the full system is all intelligent controlled, so it will save a lot of power. Compared to traditional separate air conditioner, it can save 30 w/m$^2$ and 60 w/m$^2$ power per square meter respectively for building area and air conditioner area. If the system is applied to new building of 0.2 billion square meter in the "hot-summer and cold-winter" area every year, the power saved will reach 6×106 kw, equal to the power generated by 10 power station with 6 million MW, so the benefits is very impressive.

In addition, the invention will make people much more comfortable by maintaining indoor temperature at 25° C.±1° C. in May to October and at 18° C.±1° C. in December to February with moisture maintained at 60%±10%. What is worth to mention here is the moisture control, since this area is rich in water with high moisture often above 80%, so it is difficult for sweat to volatilize, which makes people feel uncomfortable sweltering. And because there is little sunshine in winter, and moisture vapour will take heat away from human body, so it is very gloomy and cold. If the moisture could be controlled, people will feel much more comfortable. With consideration of the lack of focus on fresh air volume in both traditional separate and central air conditioner, the fresh air volume of this system is 3 times of that in specification, so people will not feel uncomfortable when using air conditioners for a long time, and keep mind clear. All in all, the system will not only make great contribution to our society, but also improve user's life with practical benefits.

The invention is especially suitable for "hot-summer and cold-winter" area, and will make life there better, prevent environmental pollution caused by traditional air conditioner, and greatly benefit modern energy-saving and emission-reduction.

To sum up, the invention addresses the problem of massive energy storage for large-scale engineering by seasonal heat and cold storage of tremendous energy from surrounding environment, which is totally suitable for large-scale engineering and has a significant effect on energy saving by combining the solar energy with seasonal energy storage without heat pump. The system standard pioneers in technology of the world, and will lead the substitute unrenewable energy with renewable energy with low potential energy used for heating and cooling in middle and large projects.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A seasonal thermal energy storage system for heat supply and removal, the system comprising:
    a) an energy-storage device;
    b) a solar collector;
    c) a refrigerating unit; and
    d) a water supply device, the water supper device being in closed-loop connection to a user terminal;
wherein:
    the energy-storage device comprises at least a heat source storage pond and a cold source storage pond, and the heat source storage pond and the cold source storage pond are connected to a water source via first water pumps;
    the water supply device comprises a hot water supply pool connected to the heat source storage pond and a cold water supply pool connected to the cold source storage pond;
    the solar collector is connected to the heat source storage pond and the hot water supply pool via second water pumps;
    the refrigerating unit is connected to the hot water supply pool and the cold water supply pool via third water pumps, and is in closed-loop connection to the user terminal;

the energy-storage device further comprises an energy-storage ball disposed in an energy-storage box;

the energy-storage ball comprises a heat energy storage ball and a cold energy storage ball;

the heat energy storage ball is in closed-loop connection to the solar collector and is connected to the user terminal; and the cold energy storage ball is in closed-loop connection to the refrigerating unit and is connected to the user terminal and the cold water supply pool.

2. The system of claim 1, wherein the heat energy storage ball and the cold energy storage ball are alternately disposed in the energy storage box in winter and in summer.

3. The system of claim 2, further comprising an auxiliary hot-water boiler in closed-loop connection to the hot water supply pool via a water pump.

4. The system of claim 3, wherein the solar collector is connected to the user terminal and is in closed-loop connection to the heat source storage pond.

5. The system of claim 1, wherein the solar collector employs a trough heat concentrating device, and the refrigerating unit employs a non-electric lithium bromide absorption refrigerating machine.

6. The system of claim 5, wherein the user terminal is a ground radiant panel.

7. The system of claim 6, wherein water inlet pipes of the heat source storage pond and the cold source storage pond are provided with a filter-sterilizer.

8. The system of claim 7, wherein temperature sensors and liquid level detectors are disposed in the heat source storage pond, the cold source storage pond, the hot water supply pool, and the cold water supply pool; and all the water pumps are provided with a magnetic valve.

9. The system of claim 8, wherein the system further comprises an intelligent control unit, the intelligent control unit is connected to the temperature sensors, the liquid level detectors, and the magnetic valve for controlling the opening/closing of the magnetic valve according to signals gathered by the temperature sensors and the liquid level detectors whereby opening/closing corresponding water pumps.

* * * * *